United States Patent [19]

Pettus et al.

[11] Patent Number: 4,735,763
[45] Date of Patent: Apr. 5, 1988

[54] FUSION POWER MONITOR

[75] Inventors: William G. Pettus, Monroe; Holland D. Warren, Lynchburg, both of Va.

[73] Assignee: The Babcock & Wilcox Company, New Orleans, La.

[21] Appl. No.: 310,936

[22] Filed: Oct. 13, 1981

[51] Int. Cl.$^4$ .................. G21B 1/00; G21C 17/00
[52] U.S. Cl. .................... 376/121; 376/143; 376/254
[58] Field of Search .............. 376/254, 143, 121

[56] References Cited

U.S. PATENT DOCUMENTS 3,819,936 6/1974 Weiss et al. ............ 376/254
3,822,184 7/1974 Weiss ................... 376/254
4,359,506 9/1982 Rawls et al. ............ 376/143

OTHER PUBLICATIONS

Nulc. Inst. & Meth., 129, (1975), pp. 1-9, North Holland Pub. Co., Morgan et al, "Measurement of Neutron Flux in a Tokamak".

Primary Examiner—Salvatore Cangialosi
Attorney, Agent, or Firm—Robert J. Edwards; Mark B. Quatt

[57] ABSTRACT

A fusion power monitor including a circulating activation medium being activated as it passes by the fusion reaction. The radioactivity of the activation medium is sensed by a remote detector to give an indication of fusion power level.

7 Claims, 2 Drawing Sheets

FUSION POWER MONITOR

BACKGROUND

The present invention relates to a nuclear reactor control system and more particularly to a power monitoring device for a nuclear fusion reactor.

Fusion is the great name for the process in which nuclei of lightweight elements combine to form heavier and more tightly bound nuclei with the simultaneous release of significant amounts of energy.

For fusion to occur the interacting nuclei must come sufficiently close together to permit short-range nuclear forces to operate. This means that one or both nuclei must be accelerated to velocities sufficient to overcome the strong electrostatic repulsion that exits between particles having the same electrical charge. The velocities required are equivalent to particle "temperatures" of the order of hundreds of millions of degrees.

Various isolated thermonuclear fusion reactions have been observed in laboratory experiments; the ones that appear promising for controlled energy release are reactions between deuterium (D) and/or tritium (T) (the heavy isotopes of hydrogen), and possibly the reaction between deuterium and the rare isotope, helium-3. The electrostatic repulsion factor is minimized in reactions between these isotopes, since their nuclei have either a single or a double charge.

While the energy released by the fusion of two lightweight atoms is considerably less than the approximately 200 Million Electron Volts (MeV) released by the fission of a single heavy atom, the energy yield per unit of mass is comparable to (in the case of the D-D reactions) or greater than (in the case of the D-T reaction) than that obtained in fission.

Fusion reactors are in an early stage of development and no power monitoring system suitable for on-line plant use has been developed. Experimental devices such as the Princeton Large Torus (PLT) have used $BF_3$ counters (such as described in J. D. Strachan, "The PLT Neutron Flux Measurement System," *PPPL-TM-303*, 1977) and activation foils (such as described in G. Zanki, J. D. Strachan, R. Lewis, W. Pettus, & J. K. Schmotzer, "Indium Activation Calibration of the 2.5 MeV Neutron Emission From PLT," *Proc. Third APS Topical Conference on High Temperature Plasma Diagnostics*, 1980) to deduce fusion reaction rates but these involve large calibration uncertainties and large time delays, respectively. Data from other plasma diagnostic instruments such as charge-exchange neutral atom detectors are also used for power inference but these are probably not feasible for commercial reactors because of radiation damage.

Moreover, monitoring systems based on $BF_3$ or similar counters located some distance from the reactor and responding primarily to thermal and intermediate energy neutron have been considered and have been used on experimental devices. However, they are difficult to calibrate and their response is influenced by changes in the isotopic composition of the blanket during its lifetime and by changes in the detector surroundings.

Commercial fusion reactors will require reliable power monitors which are responsive to operational transients and which can be calibrated to provide an accuracy of a few percent. The sensors used in these systems must be essentially maintenance-free and must be capable of long-term operation without performance degradation due to radiation or electromagnetic effects. They should also be configured so as to yield information on the neutron wall loading distribution and, by inference, on the plasma position. They should also, of course, be as simple and inexpensive as possible and they should be unobstructive with respect to first-wall and blanket space utilization.

SUMMARY OF THE INVENTION

The present invention alleviates the problem of the prior art devices to a great extent.

The present invention includes a stream of water, or other suitable fluid, flowing in a small tube around the vacuum vessel of the fusion reactor and past a radiation detector. As the fluid flows around the vacuum vessel the fluid is exposed to a neutron flux the magnitude of which is proportional to the power being generated by the fusion reaction. As the neutrons collide with a nucleus of an atom in the fluid, the nucleus may absorb the neutron and be transmitted into an isotope of the same element or into an isotope of a different element. This is called neutron activation.

Generally, subsequent to such an event, the activated nuclei is unstable and will eventually emit some form of electromagnetic or particle radiation as the nucleus decays into a more stable isotope. The time taken to so decay is a probabilistic characteristic termed the half-life. Thus, as the fluid passes through the neutron flux a number of nuclei are activated, this number being proportional to the magnitude of the neutron flux.

The fluid is then routed past a remote counting station where a radiation detector senses the magnitude of the radiation flux being emitted from the decaying activated nuclei. This radiation flux is proportional to the power of the fusion reaction. The detector generates a signal indicative of the fusion power level.

The fusion power monitoring system according to the present invention offers a number of advantages over the prior systems: (1) calibration capability within a few percent relative and within about ten percent absolute; (2) the system responds almost entirely to first-fight neutrons directly from the plasma and the results are therefore essentially independent of changes in blanket composition; (3) the system offers a possibility of inferring the plasma position within the reactor vessel and the neutron source distribution within the plasma; (4) the required volume of fluid in the activation zone is very small, on the order of one liter or less, and the monitoring system does not encumber premium blanket space around the reactor; and (5) all parts of the system requiring regular maintenance can be remotely located where they are directly accessible.

DETAILED DESCRIPTION OF THE PREFERRED EMBODIMENT

Figure 1:
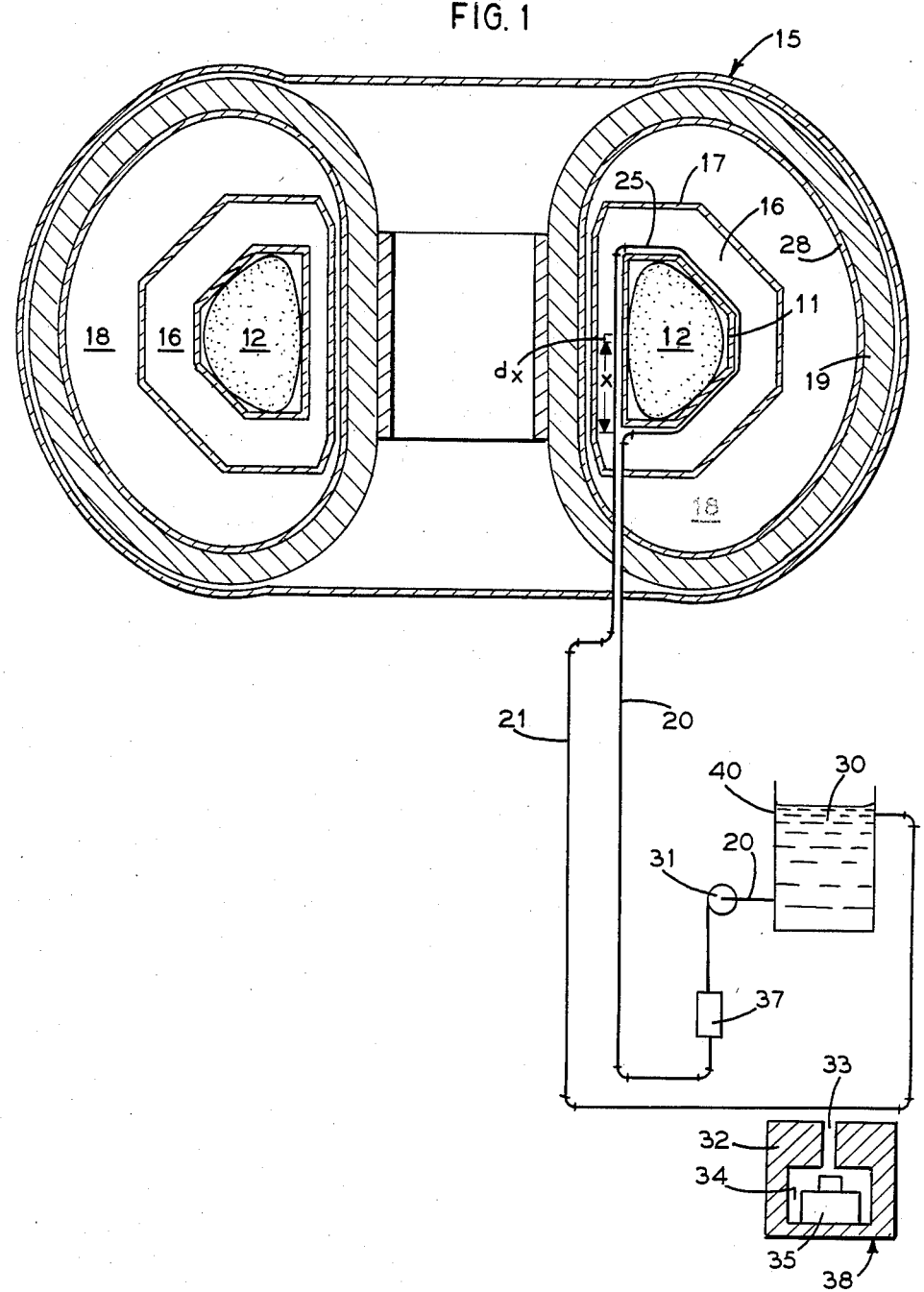
FIG. 1 is a schematic representation of a fusion power monitor according to the present invention.

Refer now to FIG. 1 there being shown a schematic representation of a fusion power monitor according to a preferred embodiment of the present invention. Fusion reactor 15, shown in section, includes toroidal plasma region 12 contained within vacuum vessel 11. The plasma region is the site of the fusion reaction. Lithium oxide blanket 16 envelopes the vacuum vessel and is contained within blanket wall 17 and serves as a shield absorbing neutrons emitted from the fusion reaction and also serves as a source of tritium to fuel the fusion reactor.

Coolant passage 18, bounded by wall 28, provides means for removing heat for the reactor for generating steam and consequently electricity in a known manner.

Magnetic coils 19 provide a magnetic bottle for containing plasma 12 within vacuum vessel 11.

The fusion power monitor system according to the present invention includes a holdup tank 40 which holds a supply of activation fluid 30. Fluid 30 is pumped via pump 31 through feed tube 20 and flow regulator 37. Feed tube 20 penetrates coils 19, wall 28, passage 13, wall 17 and blanket 16 to feed activation fluid 30 to poloidal loop tube 25. Tube 25 poloidally circumscribes vessel 11. As fluid 30 traverses tube 25, it is activated by neutron reaction and becomes radioactive. Tube 25 feeds fluid 30 to return tube 21 which is routed past remote detector 38.

Radiation emitted from now radioactive fluid 30 is detected by counter 35 positioned in cavity 34 of detector 38 as the fluid passes by aperture 33 of radiation shield 32. The function of radiation counters and detectors are well known in the art and therefore are not discussed herein. The relationship between the count rate and the fusion power is explained in detail in "A conceptual Fusion Power Monitor Based on the $^{16}O(n,p)^{16}N$ Reaction," W. G. Pettus, presented at the Fourth American Nuclear Society Topical Meeting on the Technology of Controlled Nuclear Fusion, Oct. 14–17, 1980. A brief treatment of the subject sufficient to enable an understanding of the present invention is given below.

In the preferred embodiment, water is the activation fluid 30 and the $^{16}O(n,p,)^{16}N$ reaction produces a radioactive isotope $^{16}N$. This reaction has a number of characteristics which make it a promising one to utilize in the monitoring system of the present invention.

The approximately 10 MeV reaction threshold incident neutron energy insures that most of the activity will be caused directly by first-flight fusion neutrons.

Also the predominant 6.13 and 7.11 MeV gammas emitted following the beta-decay of $^{16}N$ are easily discriminated from normal background radiation.

The 7.16 second halflife of $^{16}N$ is ideal for remote counting.

Adequate activation rates can be obtained from water flowing through a single turn of one quarter inch inside diameter tubing around the vacuum vessel.

With reference to FIG. 1, the fundamental relation that describes the response of systems of this type is $$A'(t) + \lambda \Sigma \int_0^{s/v} \phi_{\it eff}(t,\tau) e^{-\lambda \tau} d\tau \qquad (1)$$

where A'(t) is the activity per unit volume of the fluid as it leaves the activation zone, $\Sigma$ is the macroscopic cross section for the reaction $\phi$eff(t,$\tau$) is the effective neutron flux seen by a small slug of fluid upstream from the exit point by a transmit time $\tau$, $\lambda$ is the decay constant of the induced activity (assumed to be essentially single stage decay), v is the fluid velocity, and s is the length of the conduit tubing in the activation zone. In general, $$\phi_{\it eff}(t,\tau) = \psi(\tau)P(t-\tau) \qquad (2)$$

where $\psi(\tau)$ is a time-independent shape function which essentially describes the neutron wall loading distribution along the conduit (i.e., at a distance $x = v^\tau$ upstream from the exit), and $P(t-\tau)$ is purely a time dependent function which gives the instantaneous power level at the time that reference fluid slug passed the point x.

If the fluid transit time (assuming slug flow) from the vacuum vessel wall 11 to counter aperture 33 is t', then the activity at the counter 38 is $$\begin{aligned} A(t) &= A'(t - t')e^{-\lambda t'} \\ &= \lambda \Sigma e^{-\lambda t'} \int_0^{s/v} \psi(\tau) P(t - t' - \tau) e^{-\lambda \tau} d\tau \end{aligned} \qquad (3)$$

If the function $\psi$ is known, then the power level P(t) can be determined from the measurement of the activity A(t).

Figure 2:
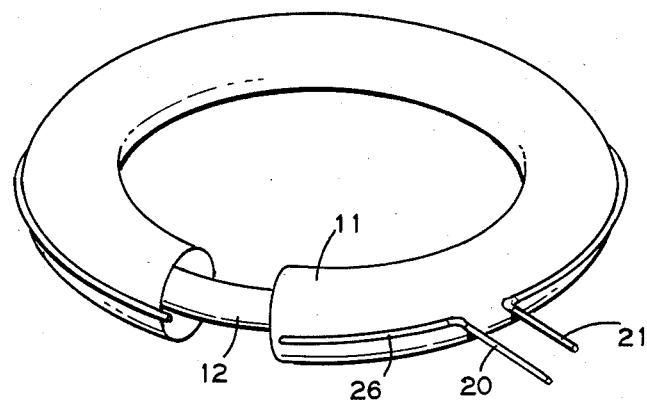
FIG. 2 is a schematic representation of the fusion power monitor of FIG. 1 showing a toroidal configuration tube loop.

The conduit carrying activation fluid 30 can be configured in various ways around vacuum vessel 11 of the fusion reactor 15. FIG. 2 shows a configuration, tube loop 26, which loops around vessel 11 in the toroidal sense and provides a measure of integral plasma power plus an indication of any toroidal power ripple or other torroidal variation if any exists. Several loops of this type located at different positions in the poloidal sense can be used to monitor plasma 12 position and to infer the gross features of the radial/poloidal (r,$\theta$) distribution.

Figure 3:
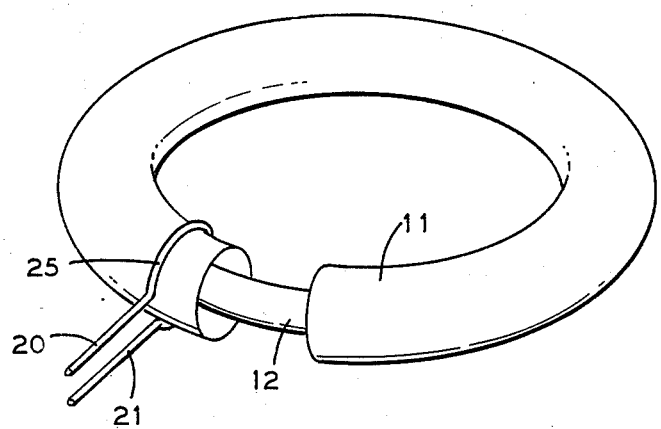
FIG. 3 is a view like FIG. 2 showing a poloidal configuration tube loop.

The poloidal loop configuration tube 25, illustrated in FIGS. 1 and 3 is expected to yield the best information on the spatial distribution of plasma 12 for any single loop and moreover, a single loop of this type may satisfy the primary power monitoring requirement for a fusion power reactor.

Figure 4:
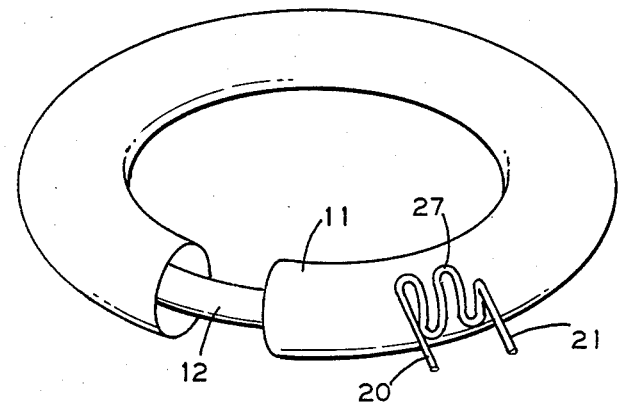
FIG. 4 is a view like FIG. 2 showing a spot configuration tube loop.

FIG. 4 illustrates a local loop 27 which could be used to monitor the neutron flux in particularly sensitive areas as well as for gross power monitoring. A set of four loops of this type arranged for quadrant poloidal coverage could be used for precise monitoring of the plasma position.

The tubing 25, 26, 27 forming the activation loop can be quite small, i.e., less than one quarter inch inside diameter, for any of these configurations and therefore there should be essentially no interference from the standpoint of blanket 16 utilization. This tubing could be welded or brazed to structural members or the vessel wall 11.

Hold-up tank 40 as shown in FIG. 1 is incorporated to minimize the build-up of activity from repeated cycling of the activation fluid. The build-up factor is of the form $1 + e^{-\lambda T} + e^{-2\lambda T} + \ldots$ which approaches $1/(1-e^{-\lambda T})$ after a large number of cycles. If the product of the activity decay constant ($\lambda$) and the loop transit time (T) is greater than five then the build-up correction is less than one percent and is probably negligible for most applications. In some cases it may be desirable to omit the hold-up tank and to account for the build-up analytically. With water as the activation fliud, it may be feasible to discharge the fluid after one cycle and to use fresh intake water entirely.

The activation fluid is not limited to water. Any fluid, either liquid or gas, can be used provided it has a suitable neutron cross section, readily countable decay products, and a suitable decay half-life. Many suitable oxygen-bearing liquids and gases are readily available and with these either the $^{16}$N decay or the $^{17}$N decay or both can be used with appropriate detector systems. For example, $CO_2$ or even air may be useful for monitoring at high poer levels. Mixtures of several different detector materials may also be useful in some applications.

Many different configurations of the activation fluid loop are possible in addition to those illustrated in FIGS. 2-4. The effective part of the loop in which the neutron activation occurs may be either fixed or movable to permit direct spatial flux mapping. In the case of those reactor designs that employ water or other useful fluids as coolants, a part of this coolant stream can be diverted to a remote counting station for power monitoring thereby obviating the need for separate monitor loops.

For certain applications an activation material of solid form such as mechanically driven slender wires or rods or pneumatically driven balls can be employed. These can be either fixed or moving during their activation and then be driven to a remote counting station and then back to the reactor for a subsequent activation cycle. Teflon is a useful activation material with the various threshold reactions in fluorine used for neutron detection.

Certain of the useful neutron reactions such as $^{16}O(n,p)^{16}N$ and $^{17}O(n,p)^{17}N$ result in the emission of very high beta particles and these produce Cherenkov light as they pass through water or certain other materials. A measurement of this light intensity can be employed for reactor power or neutron flux monitoring instead of the measurement of gamma radiation or neutron emission as described. The light intensity measurement can be made either at a remote station or at the activation site through fiber-optics or other light conduits.

While all of the above processes depend on neutron activation of the detector material, it is also possible that gamma-induced reactions may provide useful information on the reactor status (especially spurious modes producing runaway electrons and subsequent high-energy bremsstrahlung). These events may be monitoried in a system similar to those proposed here for normal power monitoring.

The above description and drawings are illustrative of an embodiment which achieves the objects, features and advantages of the present invention and it is not intended that the present invention be limited thereto. Any modifications of the present invention which come within the spirit and scope of the following claims is considered part of the invention.

What is claimed as new and desired to be secured by Letters Patent of the United States is:

1. A power monitoring system for a fusion reactor of the type having a plasma region contained within a vacuum vessel by a magnetic field comprising:
   radiation detection means;
   an activation medium; and
   circulation means for circulating said activation medium by the vacuum vessel and by said radiation detection means wherein said circulation means includes a feed tube penetrating the fusion reactor to the vacuum vessel, a loop tube fed by said feed tube and passing over the vacuum vessel wherein the activation fluid is activated, and a return tube fed by said loop tube and extending out of the fusion reactor and to said radiation detection means.

2. A power monitoring system as in claim 1 wherein said activation medium is water.

3. A power monitoring system as in claim 1 wherein said loop tube circumscribes the vacuum vessel in a toroidal configuration.

4. A power monitoring system as in claim 1 wherein said loop tube circumscribes the vacuum vessel in polodial configuration.

5. A power monitoring system as in claim 1 wherein said loop tube traverses a localized area of said vacuum vessel.

6. A power monitoring system as in claim 1 further comprising a flow regulator positioned to regulate the flow rate of said activation medium.

7. A power monitoring system as in claim 1 further comprising a hold-up tank fed by said return tube and feeding said feed tube.

* * * * *